(12) United States Patent
Vukov

(10) Patent No.: US 12,511,179 B2
(45) Date of Patent: Dec. 30, 2025

(54) MANAGING APPLICATION PROGRAMMING INTERFACES (APIS) OF A WEB APPLICATION

(71) Applicant: Dell Products L.P., Round Rock, TX (US)

(72) Inventor: Alexander Vukov, Sofia (BG)

(73) Assignee: Dell Products L.P., Round Rock, TX (US)

(*) Notice: Subject to any disclaimer, the term of this patent is extended or adjusted under 35 U.S.C. 154(b) by 504 days.

(21) Appl. No.: 17/934,037

(22) Filed: Sep. 21, 2022

(65) Prior Publication Data
US 2024/0095108 A1    Mar. 21, 2024

(51) Int. Cl.
*G06F 9/54* (2006.01)
*G06F 9/445* (2018.01)

(52) U.S. Cl.
CPC .......... *G06F 9/547* (2013.01); *G06F 9/44505* (2013.01)

(58) Field of Classification Search
CPC ......... G06F 9/547; G06F 9/44505; G06F 8/71
See application file for complete search history.

(56) References Cited

U.S. PATENT DOCUMENTS

| | | | | |
|---|---|---|---|---|
| 6,393,437 B1* | 5/2002 | Zinda | ................. | G06F 11/3698 |
| | | | | 717/124 |
| 11,470,183 B1* | 10/2022 | Jain | ..................... | H04L 12/4633 |
| 11,916,994 B1* | 2/2024 | Dobrinin | ................ | G06F 8/315 |
| 2009/0037523 A1* | 2/2009 | Kolke | ................ | H04L 67/1095 |
| | | | | 709/203 |
| 2013/0263160 A1* | 10/2013 | Sandholm | ............... | G06F 9/541 |
| | | | | 719/330 |
| 2014/0222894 A1* | 8/2014 | Gangadharan | ...... | H04L 65/1033 |
| | | | | 709/203 |
| 2015/0186132 A1* | 7/2015 | Oliveri | ...................... | G06F 8/34 |
| | | | | 717/120 |
| 2016/0314219 A1* | 10/2016 | Yu | ............................. | G06F 8/36 |
| 2017/0161026 A1* | 6/2017 | Wood | .................. | G06F 9/45558 |

(Continued)

OTHER PUBLICATIONS

Grocevs et al., State Synchronization Approaches in Web-based Applications, Dec. 1, 2014, Applied Computer Systems, vol. 16, Issue 1, pp. 92-96 (Year: 2014).*

(Continued)

*Primary Examiner* — Kevin L Young
*Assistant Examiner* — Jennifer Marie Gutman
(74) *Attorney, Agent, or Firm* — McDermott Will & Schulte LLP

(57) ABSTRACT

Managing APIs of a web application, including: developing, at a local IHS, a web application that includes an API for providing a portion of the web application, the API associated with a first URL associated with a host IHS that provides a first version of the portion; temporarily modifying the API from being associated with the first URL to a second URL, including: receiving input at the local IHS indicating i) the second URL and ii) approval to associate the second URL with the API, wherein the second URL is associated with the local IHS; in response to the user input: updating settings for the web application such that the API is associated with the second URL, the second URL providing a second version of the portion; storing the updated settings in a session storage for a browser of the first IHS that provides for display the web application.

18 Claims, 6 Drawing Sheets

(56) References Cited

U.S. PATENT DOCUMENTS

| | | | | |
|---|---|---|---|---|
| 2018/0115597 | A1* | 4/2018 | Gillette | H04L 67/52 |
| 2019/0384617 | A1* | 12/2019 | Jain | G06F 9/547 |
| 2020/0137138 | A1* | 4/2020 | Rice | H04L 61/4511 |
| 2020/0293388 | A1* | 9/2020 | Cyr | G06F 40/14 |
| 2020/0301674 | A1* | 9/2020 | Swope | G06F 9/54 |
| 2021/0373860 | A1* | 12/2021 | Khan | G06F 9/546 |
| 2022/0100644 | A1* | 3/2022 | Tiwari | G06F 8/74 |
| 2022/0283805 | A1* | 9/2022 | Dasa | H04L 67/1097 |
| 2023/0086308 | A1* | 3/2023 | Lim | G06F 16/958 |
| 2024/0004785 | A1* | 1/2024 | Melnyk | G06F 11/3688 |

OTHER PUBLICATIONS

Kumara, Chandika Udaya, Redirect some API requests in a Website to localhost for Dev Test / Debug, Aug. 28, 2021, Medium (Year: 2021).*

Kumar, Akhilesh, Understanding the type of storage in a web browser., May 16, 2021, Medium (Year: 2021).*

"Window.sessionStorage", Sep. 9, 2022, MDN Web Docs, pp. 1-3 (Year: 2022).*

"Classes", Sep. 9, 2022, MDN Web Docs, pp. 1-9 (Year: 2022).*

\* cited by examiner

```
endpoints.tsx
import Endpoint from "./lib/endpointCollie"; // Import the Endpoint class // Add and export new endpoint URLs below:

export const authentication = new Endpoint({
  "authentication",
  "Authentication API",
  "/security/api/v1/authentication",
});

export const permissions = new Endpoint({
  "permissions",
  "Permissions API",
  "/am/api/v1/permissions",
});

export const dcnPermissions = new Endpoint({
  "dcnPermissions",
  "Dcn Permissions API",
  "/prainvoice/api/v1/dcnpermissions",
});
```

FIG. 4

```
1  //Example
2
3  //Import the Endpoint class instance for the "authentication" URL:
4  import { authentication } from "./endpoints";
5
6  //Get the overriden URL if set. Else get the default URL:
7  let URL = authentication.getBaseUrl();
8
9  //Use the URL normally in fetch() requests...
10
```

FIG. 5

MANAGING APPLICATION PROGRAMMING INTERFACES (APIS) OF A WEB APPLICATION

BACKGROUND

Field of the Disclosure

The disclosure relates generally to managing application programming interfaces of a web application.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

Innovative aspects of the subject matter described in this specification may be embodied in a method of managing application programming interfaces (APIs) of a web application, including developing, at a local information handling system (IHS), a front-end web application that includes an application programming interface (API) for providing a portion of the front-end web application, the API associated with a first uniform resource locator (URL) associated with a host IHS that provides a first version of the portion; temporarily modifying the API from being associated with the first URL to a second URL, including: receiving user input at a user interface of the local IHS indicating i) the second URL and ii) approval to associate the second URL with the API, wherein the second URL is associated with the local IHS; in response to the user input: updating settings for the front-end web application such that the API is associated with the second URL, the second URL providing a second version of the portion; and storing the updated settings for the front-end web application in a session storage for a web browser of the first IHS that provides for display the web application.

Other embodiments of these aspects include corresponding systems, apparatus, and computer programs, configured to perform the actions of the methods, encoded on computer storage devices.

These and other embodiments may each optionally include one or more of the following features. For instance, loading the front-end web application at the web browser of the first IHS; in response to the loading, determining whether the API is associated with the first URL; and in response to determining that the API is not associated with the first URL, returning the second URL from the session storage for the web browser of the first IHS. In response to determining that the API is associated with the first URL, returning the first URL. Storing the updated settings for the front-end web application only at the session storage for the web browser of the first IHS. The portion of the front-end web application is a micro-frontend (MFE). Receiving additional user input at the user interface of the local IHS indicating i) the first URL and ii) approval to reset the API to be associated with the first URL; in response to the additional user input: updating settings for the front-end web application such that the API is associated with the first URL; and storing the updated settings for the front-end web application in the session storage for the web browser of the first IHS. Reloading the front-end web application at the web browser of the first IHS; and in response to reloading the front-end web application, maintaining the updated settings for the front-end web application in session storage for the web browser of the first IHS.

The details of one or more embodiments of the subject matter described in this specification are set forth in the accompanying drawings and the description below. Other potential features, aspects, and advantages of the subject matter will become apparent from the description, the drawings, and the claims.

BRIEF DESCRIPTION OF DRAWINGS

FIGS. 4 and 5 illustrate computer-implemented programming code for managing application programming interfaces.

DESCRIPTION OF PARTICULAR EMBODIMENT(S)

Figure 1:
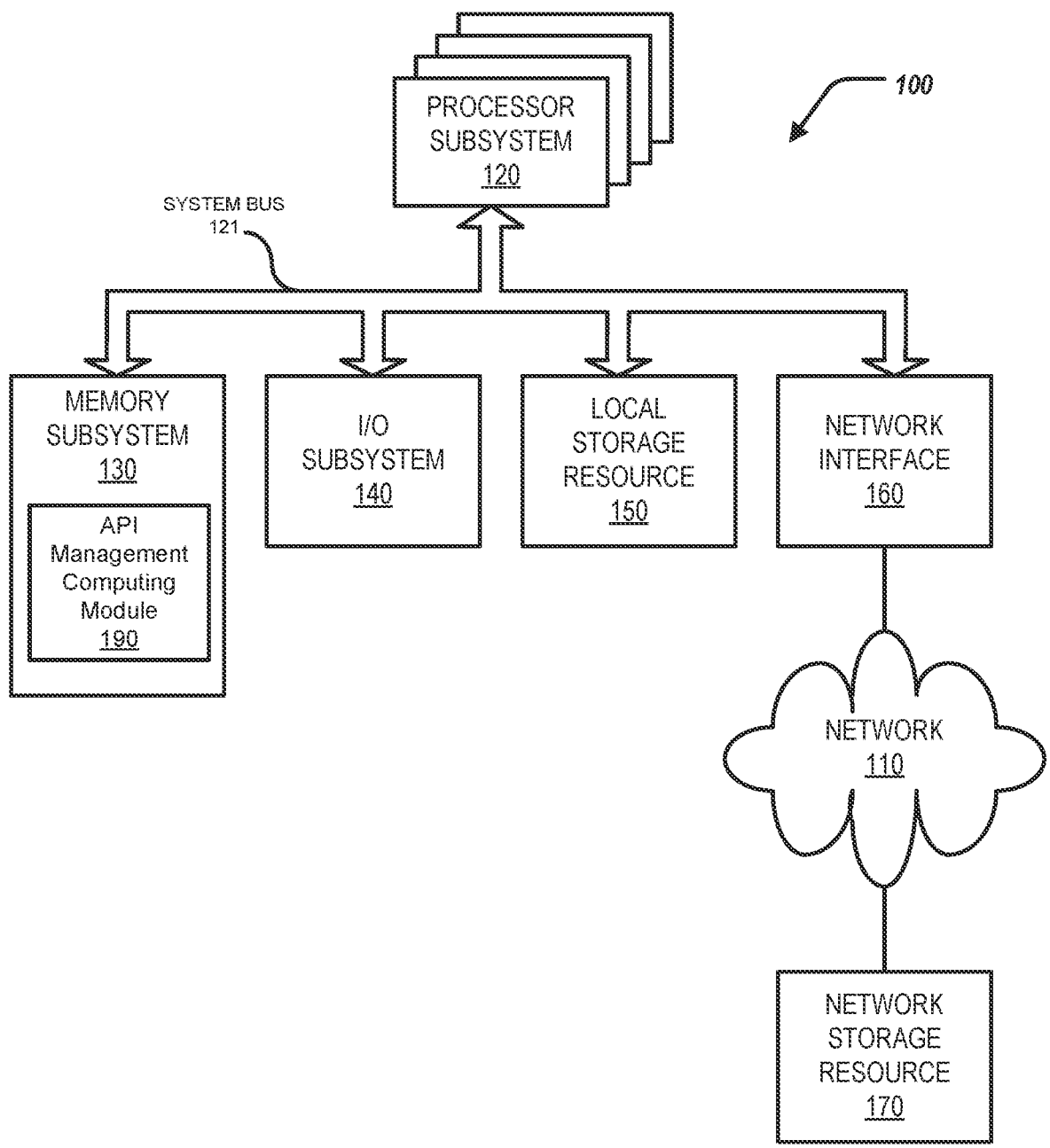
FIG. 1 is a block diagram of selected elements of an embodiment of an information handling system.

This disclosure discusses methods and systems for managing application programming interfaces for a web application. In short, a uniform resource locator (URL) of an application programming interface (API) of a web application is temporarily modified. The modified URL can point to a local source that is developing the web application. By doing so, a developer of the web application can "test" different versions of content of the web application without affecting other developers.

Specifically, this disclosure discusses a system and a method for managing application programming interfaces (APIs) of a web application, including developing, at a local information handling system (IHS), a front-end web application that includes an application programming interface (API) for providing a portion of the front-end web application, the API associated with a first uniform resource locator (URL) associated with a host IHS that provides a first version of the portion; temporarily modifying the API from being associated with the first URL to a second URL, including: receiving user input at a user interface of the local IHS indicating i) the second URL and ii) approval to associate the second URL with the API, wherein the second URL is associated with the local IHS; in response to the user input: updating settings for the front-end web application such that the API is associated with the second URL, the second URL providing a second version of the portion; and storing the updated settings for the front-end web application in a session storage for a web browser of the first IHS that provides for display the web application.

In the following description, details are set forth by way of example to facilitate discussion of the disclosed subject matter. It should be apparent to a person of ordinary skill in the field, however, that the disclosed embodiments are exemplary and not exhaustive of all possible embodiments.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include an instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory (SSD); as well as communications media such wires, optical fibers, microwaves, radio waves, and other electromagnetic and/or optical carriers; and/or any combination of the foregoing.

Particular embodiments are best understood by reference to FIGS. 1-6 wherein like numbers are used to indicate like and corresponding parts.

Turning now to the drawings, FIG. 1 illustrates a block diagram depicting selected elements of an information handling system 100 in accordance with some embodiments of the present disclosure. In various embodiments, information handling system 100 may represent different types of portable information handling systems, such as, display devices, head mounted displays, head mount display systems, smart phones, tablet computers, notebook computers, media players, digital cameras, 2-in-1 tablet-laptop combination computers, and wireless organizers, or other types of portable information handling systems. In one or more embodiments, information handling system 100 may also represent other types of information handling systems, including desktop computers, server systems, controllers, and microcontroller units, among other types of information handling systems. Components of information handling system 100 may include, but are not limited to, a processor subsystem 120, which may comprise one or more processors, and system bus 121 that communicatively couples various system components to processor subsystem 120 including, for example, a memory subsystem 130, an I/O subsystem 140, a local storage resource 150, and a network interface 160. System bus 121 may represent a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

As depicted in FIG. 1, processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130 and/or another component of information handling system). In the same or alternative embodiments, processor subsystem 120 may interpret and/or execute program instructions and/or process data stored remotely (e.g., in network storage resource 170).

Also in FIG. 1, memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. In various embodiments, I/O subsystem 140 may be used to support various peripheral devices, such as a touch panel, a display adapter, a keyboard, an accelerometer, a touch pad, a gyroscope, an IR sensor, a microphone, a sensor, or a camera, or another type of peripheral device.

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. Likewise, the network storage resource may comprise computer-readable media (e.g., hard disk drive, floppy disk drive, CD-ROM, and/or other type of rotating storage media, flash memory, EEPROM, and/or other type of solid state storage media) and may be generally operable to store instructions and/or data.

In FIG. 1, network interface 160 may be a suitable system, apparatus, or device operable to serve as an interface between information handling system 100 and a network 110. Network interface 160 may enable information handling system 100 to communicate over network 110 using a suitable transmission protocol and/or standard, including, but not limited to, transmission protocols and/or standards enumerated below with respect to the discussion of network 110. In some embodiments, network interface 160 may be communicatively coupled via network 110 to a network storage resource 170. Network 110 may be a public network or a private (e.g. corporate) network. The network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data). Network interface 160 may enable wired and/or wireless communications (e.g., NFC or Bluetooth) to and/or from information handling system 100.

In particular embodiments, network 110 may include one or more routers for routing data between client information handling systems 100 and server information handling systems 100. A device (e.g., a client information handling system 100 or a server information handling system 100) on network 110 may be addressed by a corresponding network address including, for example, an Internet protocol (IP) address, an Internet name, a Windows Internet name service (WINS) name, a domain name or other system name. In particular embodiments, network 110 may include one or more logical groupings of network devices such as, for example, one or more sites (e.g. customer sites) or subnets. As an example, a corporate network may include potentially thousands of offices or branches, each with its own subnet (or multiple subnets) having many devices. One or more client information handling systems 100 may communicate with one or more server information handling systems 100 via any suitable connection including, for example, a modem connection, a LAN connection including the Ethernet or a broadband WAN connection including DSL, Cable, Ti, T3, Fiber Optics, Wi-Fi, or a mobile network connection including GSM, GPRS, 3G, or WiMax.

Network 110 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 110 and its various components may be implemented using hardware, software, or any combination thereof.

The information handling system 100 can also include an application management interface (API) management computing module 190. The API management computing module 190 can be included by the memory subsystem 130. The API management computing module 190 can include a computer-executable program (software). The API management computing module 190 can be executed by the processor subsystem 120.

In short, the API management computing module 190 can facilitate temporarily modifying a uniform resource locator (URL) of an application programming interface (API) of a web application. The modified URL can point to a local source that is developing the web application. By doing so, a developer of the web application can "test" different versions of content of the web application without affecting other developers.

Figure 2:
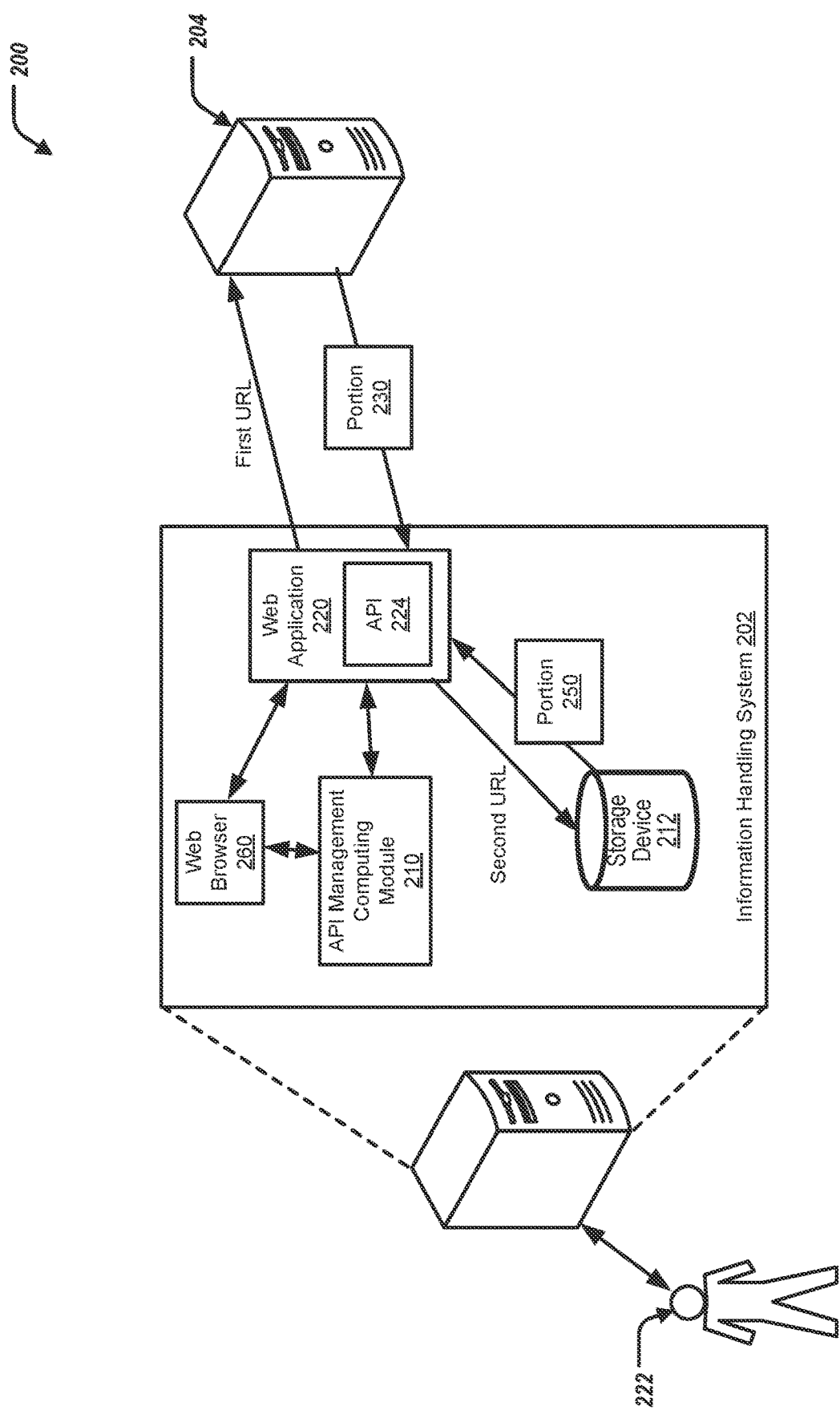
FIG. 2 illustrates a block diagram of a computing environment for managing application programming interfaces for a web application.

Turning to FIG. 2, FIG. 2 illustrates an environment 200 including a local information handling system 202 and a host information handling system 204. The information handling system 202 can include an API management computing module 210, a storage device 212, and a web browser 260. In some examples, the local information handling system 202 is similar to, or includes, the information handling system 100 of FIG. 1. In some examples, the API management computing module 210 is the same, or substantially the same, as the API management computing module 190 of FIG. 1. In some examples, the host information handling system 204 is similar to, or includes, the information handling system 100 of FIG. 1.

The API management computing module 210 can be in communication with the web application 220 and the web browser 260. The web application 220 can be in communication with the web browser 260 and the storage device 212. The web browser 260 can in communication with the API management computing module 210 and the web application 220.

The local information handling system 202 is in communication with the host information handling system 204.

A front-end web application 220 can be developed at the local information handling system 202. For example, a user 222 can interact with the local information handling system 202 by providing user input to develop the web application 220. For example, the user 222 can provide/generate computer-executable programming code associated with the web application 220. The web application 220 can include a plurality of application programming interfaces (APIs), with a particular API 224 shown. The API 224 can facilitate providing a portion of the web application 220, e.g., a displayable portion of the web application 220 (a portion of the web application 220 that is provided display on a graphical user interface (GUI) of a display device). Each of the APIs of the web application 220 can be associated with a different uniform resource locator (URL). For each API of the web application 220, the URL for the API can be associated with a particular host information handling system that provides content for the API. For example, the API 224 is associated with a first URL. The first URL is associated with the host information handling system 204. To that end, when loading (or testing) of the web application 220, the API 224 can receive a first version 230 of the portion of the web application 220 from the host information handling system 204 via the first URL.

In some examples, the web application 220 can be stored by multiple different information handling systems across a network. In some examples, the web application 220 is accessed by multiple different information handling systems across a network.

In some examples, the portion of the web application 220 is a micro-frontend (MFE).

The API management computing module 210 can temporarily modify the API 224 from being associated with the first URL to being associated with a second URL. For example, when the web application 220 is being tested (e.g., by the user 222), it is beneficial to the user 222 to switch between different versions of the API 224 and different versions of the portion of the content loaded/accessed by the API 224. For example, it can be beneficial to the user 222 to implement changes to the content loaded/accessed by the API 224 for testing without applying such changes permanently (and/or across multiple devices developing the web application 220). For example, when the API 224 loads graphical elements (content), the user 222 may implement changes to the graphical elements (content) for testing without applying such changes permanently.

Figure 3:
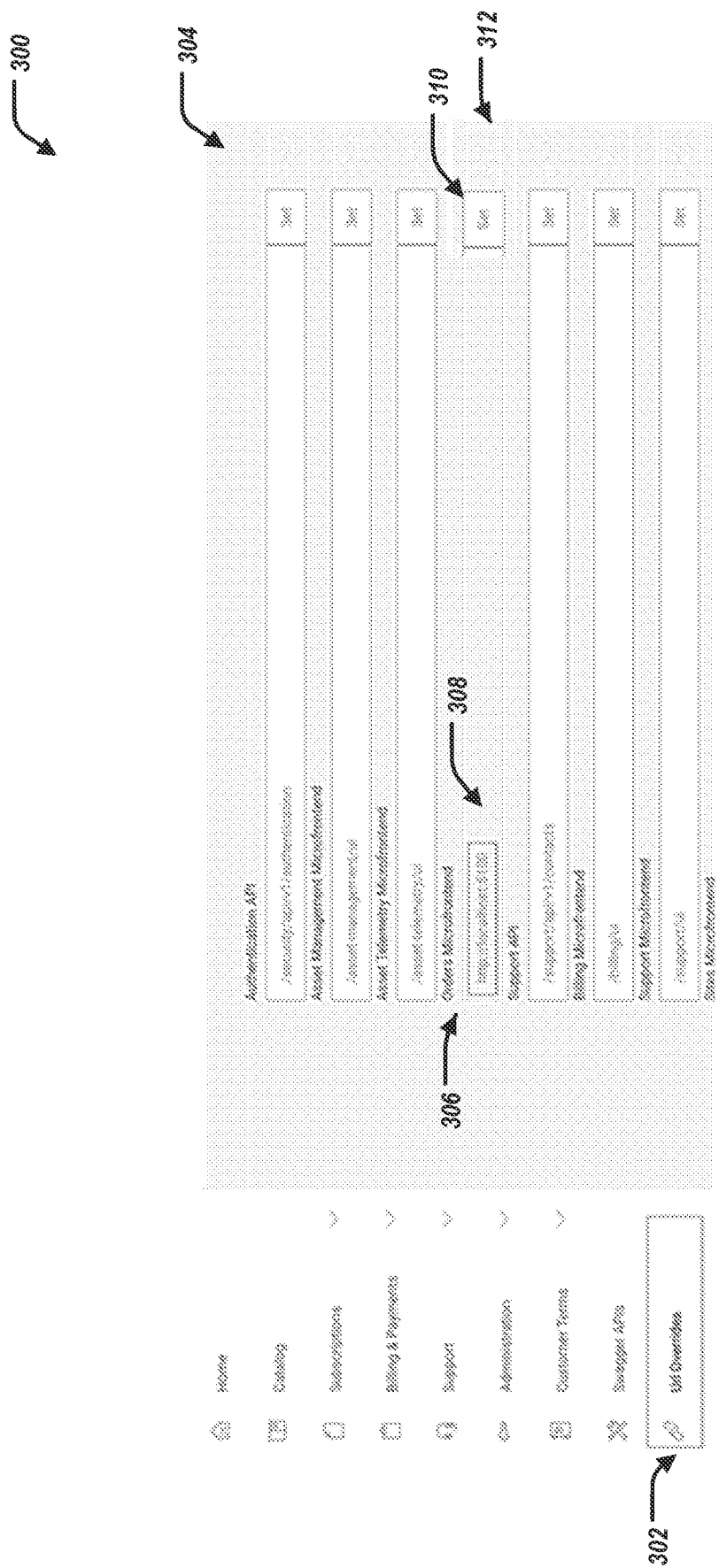
FIG. 3 illustrates a graphical user interface for managing application programming interfaces.

Specifically, the API management computing module 210 can temporarily modify the API 224 by receiving user input (provided by the user 222) at a graphical user interface (GUI) of the local information handling system 202. The user input can indicate i) the second URL, and indicate ii) approval to associate the second URL with the API 224. FIG. 3 illustrates a GUI 300 for modifying the API 224. Specifically, the GUI 300 can include an URL overrides tab 302, such that when selected, provides an interface 304 for modifying APIs of the web application 220, including the API 224. For example, the interface 304 includes a graphical interface 306 that is associated with the API 224 for editing the URL associated with the API 224. As illustrated, the graphical interface 306 indicates the API 224 is an "Orders Microfrontend" API. The graphical interface 306 additionally indicates an URL portion 308, an approval interface 310, and a reset interface 312.

Continuing the example, the user 222 can provide user input at the GUI 300 that is provided for display at the local information handling system 202. Specifically, the user 222 indicates the second URL for the API 224 by inputting the second URL at the URL portion 308 of the graphical interface 306. For example, the user 222 indicates the second URL of "http://localhost:5100" for the API 224 at the URL portion 308 of the graphical interface 306. Further, the user 222 can indicate approval to associate the second URL with the API 224 by selecting the approval interface 310. For example, the user 222 indicates that the second URL of "http://localhost:5100" is approved for association with the API 224.

In some examples, the second URL is associated with the local information handling system 202. That is, the second URL directs the API 224 to the local information handling system 202. For example, the "localhost:5100" is the local information handling system 202.

The API management computing module 210, in response to the user input, updates settings of the web application 220 such that the API 224 is associated with the second URL. The second URL is associated with the local information handling system 202. To that end, when loading (or testing) of the web application 220, the API 224 can receive a second version 250 of the portion of the web application 220 from the local information handling system 202 via the second URL, described further herein. That is, the second URL provides the second version 250 of the portion of the web application 220.

FIG. 4 illustrates an interface 400 of an example of computer-implemented programming code of the application 220. Specifically, in the computer-implemented programming code of the web application 220, an "Endpoint" JavaScript class is defined, and a new instance of the class is created with each default URL. Every entry added to the "endpoints" module will be rendered as a new input on the URL Overrides page with "Set" and "Clear" buttons (e.g., approval interface 310 and the reset interface 312). The "Set" button will be enabled when the default value is being used. Otherwise, the "Clear" button will be active.

Returning back to FIG. 2, the API management computing module 210, further in response to the user input, stores the updated settings for the web application 220 in a session storage for the web browser 260 of the local information handling system 202. That is, the API management computing module 210 stores the updated settings of the web application 220 such that the API 224 is associated with the second URL.

The web browser 260 provides for display (e.g., on a display device of the local information handling system 202) the web application 220.

In some examples, the API management computing module 210, in response to the user input, stores the updated settings for the web application 220 only at the session storage for the web browser 260 of the local information handling system 202. That is, other users interacting with (devolving) the web application 220 (at other information handling systems) are not affected as the second URL is only stored at the session storage for the web browser 260 of the local information handling system 202. For example, the web application 220 may be accessible by developers and/or accessed by multiple users located at multiple separate respective information handling systems. By storing the updated settings—the second URL of the API 224—of the web application 220 only at the local information handling system 202 and only for the user 222, the other users interacting with (devolving) the web application 220 (at other information handling systems) are not affected as the second URL. That is, for other users interacting with (devolving) the web application 220 (at other information handling systems), the API 224 of the web application is 220 is still associated with the first URL.

The web browser 260 can load the web application 220 (e.g., provide for display the web application 220 at a display device of the location information handling system 202). The web application 220, in response to the loading, can determine whether the API 224 is associated with the first URL. The web application 220, in response to determining that the API 224 is not associated with the first URL, identifies the second URL of the API 224 (that is associated with the API 224) and returns the second URL from the session storage for the web browser 260 of the local information handling system 202. The API 224 then utilizes the second URL to access the storage device 212 to obtain the second version 250 of the portion of the web application 220.

Continuing the example, the API 224 utilizes the second URL of "http://localhost:5100" to access the storage device 212 to obtain the second version 250 of the portion of the web application 220.

FIG. 5 illustrates an interface 500 of an example of computer-implemented programming code of the application 220. Specifically, in the computer-implemented programming code of the web application 220, the "Endpoint" class exposes a method called "getBaseUrl( )" that will check whether the URL for the requested endpoint has been overridden and is present in the session storage. If it has been overridden, then the custom value will be returned from the session storage; if not—then the default value will be returned. The "getBaseUrl( )" method is used to obtain every URL inside the application code. This provides that all URLs can be overridden locally.

In some examples, the web browser 260 reloads the web application 220. The web browser 260, in response to reloading the web application 220, maintains the updated setting for the web application 220 in the session storage for the web browser 260. In other words, the updated settings for the web application 220 are persisted in the session storage for the web browser 260 during reloading and will not be lost when the web application is reloaded. Continuing the example, the updated settings of the second URL for the API 224 can be maintained in view of reloading of the web application 220.

In some examples, the API management computing module 210 can receive additional user input (provided by the user 222) at a graphical user interface (GUI) of the local information handling system 202. The additional user input can indicate i) the first URL, and indicate ii) approval to reset the API 224 to be associated with the first URL. The API management computing module 210, in response to the additional user input, updates settings of the web application 220 such that the API 224 is associated with the first URL. The API management computing module 210, further in response to the additional user input, stores the updated settings for the web application 220 in the session storage for the web browser 260 of the local information handling system 202 indicating that the API 224 is associated with the first URL.

In some examples, the web application 220, in response to determining that the API 224 is associated with the first URL, returns the first URL. The API 224 utilizes the first URL to obtain the first version 230 of the portion of the web application 220 from the host information handling system 204.

Figure 6:
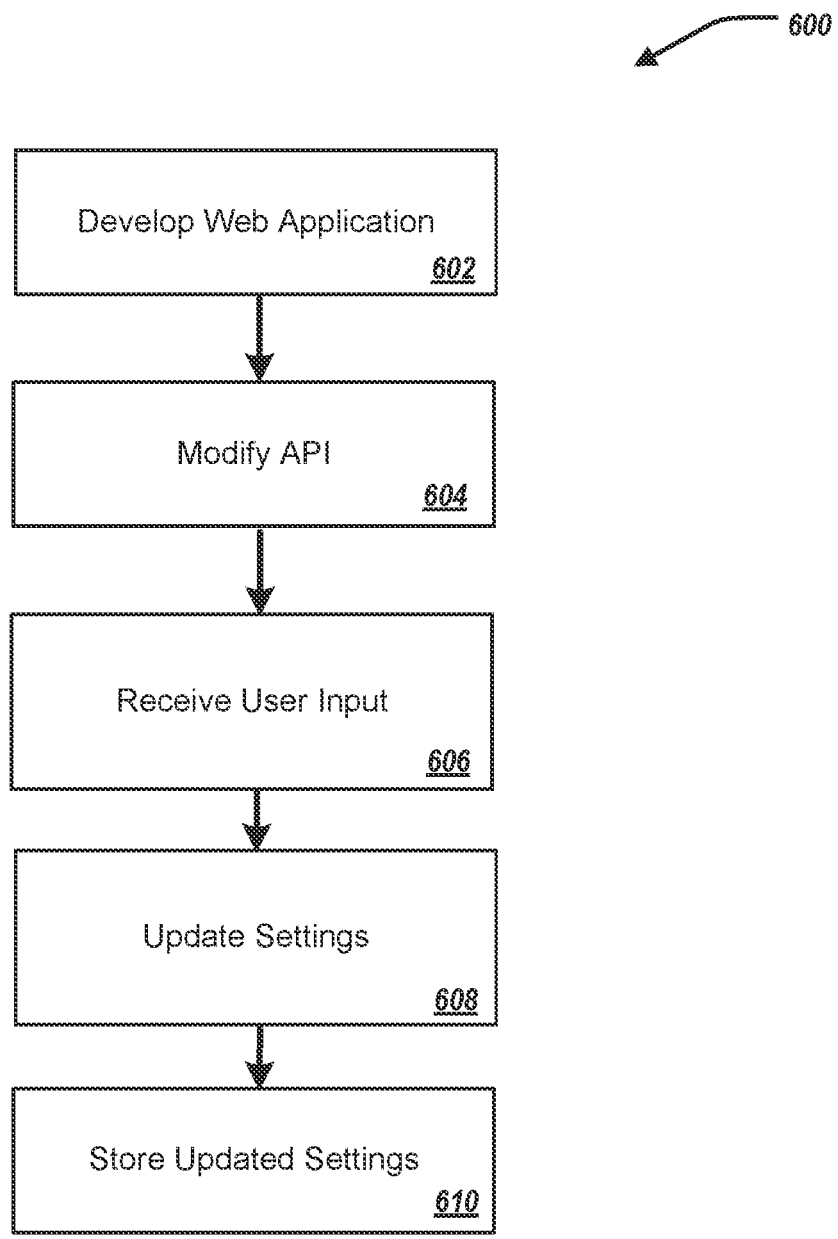
FIG. 6 illustrates a method for managing application programming interfaces for a web application.

FIG. 6 illustrates a flowchart depicting selected elements of an embodiment of a method 600 for managing APIs of a web application. The method 600 may be performed by the information handling system 100, the local information handling system 202, the host information handling system 204, and/or the API management computing module 210, and with reference to FIGS. 1-5. It is noted that certain operations described in method 600 may be optional or may be rearranged in different embodiments.

Developing, at the local information handling system 202, the front-end web application 220, at 602. The web application 220 includes the API 224 for providing a portion of the front-end web application 220. The API 224 is associated with the first URL that is associated with the host information handling system 204 that provides a first version 230 of the portion. The API management computing module 210 temporarily modifies the API 224 from being associated with the first URL to the second URL, at 604. The API management computing module 210 receives user input at a user interface of the local information handling system 202 indicating i) the second URL and ii) approval to associate the second URL with the API 224, wherein the second URL is associated with the local information handling system 202, at 606. The API management computing module 210, in response to the user input, updates settings for the front-end web application 220 such that the API 224 is associated with the second URL, the second URL providing a second version 250 of the portion, at 608. The API management computing module 210, in response to the user input, stores the updated settings for the front-end web application 220 in a session storage for the web browser 260 of the first information handling system 202 that provides for display the web application 220, at 610.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated other-wise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A computer-implemented method of managing application programming interfaces (APIs) of a web application, the method comprising:
   developing, at a local information handling system (IHS), a front-end web application that includes an application programming interface (API) for providing a portion of the front-end web application, the API associated with a first uniform resource locator (URL) and utilizes the first URL to obtain a first version of the portion of the front-end web application;
   temporarily modifying the API from being associated with the first URL to a second URL, including:
     receiving user input at a user interface of the local IHS indicating i) the second URL and ii) approval to associate the second URL with the API, wherein the second URL is associated with the local IHS;
     in response to the user input:
       updating settings for the front-end web application such to associate the API with the second URL and utilizes the second URL to obtain a second version of the portion of the front-end web application;
       creating a new instance of each endpoint scripting language class of the front-end web application; and
       storing the updated settings for the front-end web application in a session storage for a web browser of the first IHS that provides for display the web application;
   reloading the front-end web application at the web browser of the first IHS, including:
     determining, by a particular new instance of a particular endpoint scripting language class of the front-end web application, that the first URL for the front-end web application has been overridden and included in the session storage for the web browser, and in response, returning the second URL; and in response to reloading the front-end web application, maintaining the updated settings for the front-end web application in session storage for the web browser of the first IHS, including maintaining the second URL in the session storage for the web browser of the first IHS.

2. The computer-implemented method of claim 1, further comprising:

loading the front-end web application at the web browser of the first IHS;

in response to the loading, determining whether the API is associated with the first URL; and in response to determining that the API is not associated with the first URL, returning the second URL from the session storage for the web browser of the first IHS.

3. The computer-implemented method of claim 2, further comprising:

in response to determining that the API is associated with the first URL, returning the first URL.

4. The computer-implemented method of claim 1, further comprising:

storing the updated settings for the front-end web application only at the session storage for the web browser of the first IHS.

5. The computer-implemented method of claim 1, wherein the portion of the front-end web application is a micro-frontend (MFE).

6. The computer-implemented method of claim 1, further comprising:

receiving additional user input at the user interface of the local IHS indicating i) the first URL and ii) approval to reset the API to be associated with the first URL;

in response to the additional user input:

updating settings for the front-end web application such that the API is associated with the first URL; and storing the updated settings for the front-end web application in the session storage for the web browser of the first IHS.

7. An information handling system comprising a processor and memory media storing instructions executable by the processor to perform operations, comprising:

developing, at a local information handling system (IHS), a front-end web application that includes an application programming interface (API) for providing a portion of the front-end web application, the API associated with a first uniform resource locator (URL) and utilizes the first URL to obtain a first version of the portion of the front-end web application;

temporarily modifying the API from being associated with the first URL to a second URL, including:

receiving user input at a user interface of the local IHS indicating i) the second URL and ii) approval to associate the second URL with the API, wherein the second URL is associated with the local IHS;

in response to the user input:

updating settings for the front-end web application such to associate the API with the second URL and utilizes the second URL to obtain a second version of the portion of the front-end web application;

creating a new instance of each endpoint scripting language class of the front-end web application; and storing the updated settings for the front-end web application in a session storage for a web browser of the first IHS that provides for display the web application;

reloading the front-end web application at the web browser of the first IHS, including:

determining, by a particular new instance of a particular endpoint scripting language class of the front-end web application, that the first URL for the front-end web application has been overridden and included in the session storage for the web browser, and in response, returning the second URL; and in response to reloading the front-end web application, maintaining the updated settings for the front-end web application in session storage for the web browser of the first IHS, including maintaining the second URL in the session storage for the web browser of the first IHS.

8. The information handling system of claim 7, the operations further comprising:

loading the front-end web application at the web browser of the first IHS;

in response to the loading, determining whether the API is associated with the first URL; and in response to determining that the API is not associated with the first URL, returning the second URL from the session storage for the web browser of the first IHS.

9. The information handling system of claim 8, the operations further comprising:

in response to determining that the API is associated with the first URL, returning the first URL.

10. The information handling system of claim 7, the operations further comprising:

storing the updated settings for the front-end web application only at the session storage for the web browser of the first IHS.

11. The information handling system of claim 7, wherein the portion of the front-end web application is a micro-frontend (MFE).

12. The information handling system of claim 7, the operations further comprising:

receiving additional user input at the user interface of the local IHS indicating i) the first URL and ii) approval to reset the API to be associated with the first URL;

in response to the additional user input:

updating settings for the front-end web application such that the API is associated with the first URL; and storing the updated settings for the front-end web application in the session storage for the web browser of the first IHS.

13. A non-transitory computer-readable medium storing software comprising instructions executable by one or more computers which, upon such execution, cause the one or more computers to perform operations comprising:

developing, at a local information handling system (IHS), a front-end web application that includes an application programming interface (API) for providing a portion of the front-end web application, the API associated with a first uniform resource locator (URL) and utilizes the first URL to obtain a first version of the portion of the front-end web application;

temporarily modifying the API from being associated with the first URL to a second URL, including:

receiving user input at a user interface of the local IHS indicating i) the second URL and ii) approval to associate the second URL with the API, wherein the second URL is associated with the local IHS;

in response to the user input:

updating settings for the front-end web application such to associate the API with the second URL and utilizes the second URL to obtain a second version of the portion of the front-end web application;

creating a new instance of each endpoint scripting language class of the front-end web application; and storing the updated settings for the front-end web application in a session storage for a web browser of the first IHS that provides for display the web application;

reloading the front-end web application at the web browser of the first IHS, including:
  determining, by a particular new instance of a particular endpoint scripting language class of the front-end web application, that the first URL for the front-end web application has been overridden and included in the session storage for the web browser, and in response, returning the second URL; and in response to reloading the front-end web application, maintaining the updated settings for the front-end web application in session storage for the web browser of the first IHS, including maintaining the second URL in the session storage for the web browser of the first IHS.

14. The non-transitory computer-readable medium of claim 13, the operations further comprising:
  loading the front-end web application at the web browser of the first IHS;
  in response to the loading, determining whether the API is associated with the first URL; and
  in response to determining that the API is not associated with the first URL, returning the second URL from the session storage for the web browser of the first IHS.

15. The non-transitory computer-readable medium of claim 14, the operations further comprising:
  in response to determining that the API is associated with the first URL, returning the first URL.

16. The non-transitory computer-readable medium of claim 13, the operations further comprising:
  storing the updated settings for the front-end web application only at the session storage for the web browser of the first IHS.

17. The non-transitory computer-readable medium of claim 13, wherein the portion of the front-end web application is a micro-frontend (MFE).

18. The non-transitory computer-readable medium of claim 13, the operations further comprising:
  receiving additional user input at the user interface of the local IHS indicating i) the first URL and ii) approval to reset the API to be associated with the first URL;
  in response to the additional user input:
    updating settings for the front-end web application such that the API is associated with the first URL; and
    storing the updated settings for the front-end web application in the session storage for the web browser of the first IHS.

* * * * *